United States Patent [19]
Schulte

[11] 3,979,013
[45] Sept. 7, 1976

[54] PUSH PLUG

[75] Inventor: Harry R. Schulte, Gaithersburg, Md.

[73] Assignee: The United States of America as represented by the Secretary of the Navy, Washington, D.C.

[22] Filed: Sept. 12, 1974

[21] Appl. No.: 505,395

[52] U.S. Cl. .............................. 220/234; 220/287
[51] Int. Cl.² ........................................ B65D 53/00
[58] Field of Search .......... 220/234, 237, 235, 236, 220/287, 335; 138/91; 166/113, 121, 135, 140, 153

[56] References Cited
UNITED STATES PATENTS

| | | | |
|---|---|---|---|
| 546,258 | 10/1895 | Suverkrop | 220/237 |
| 746,990 | 12/1903 | Philp | 220/237 |
| 1,307,755 | 6/1919 | Ross | 220/237 |
| 1,528,185 | 3/1925 | Diederick | 220/237 |
| 2,070,579 | 2/1937 | Brooke | 220/235 |
| 2,324,545 | 7/1943 | Svirsky | 220/237 |
| 3,156,373 | 11/1964 | Willis | 220/237 |
| 3,326,403 | 6/1967 | Glass | 220/234 |
| 3,333,724 | 8/1967 | Croft | 220/237 |
| 3,525,365 | 8/1970 | Meulendyr | 220/237 |

Primary Examiner—R. E. Hart

[57] ABSTRACT

A readily insertable and removable closure plug comprising an expander core having a sealing member positioned circumferentially thereon. The expander core comprises at least two adjacent segments, one cylindrical in cross-section and the other tapered in cross-section. The sealing member is annular in shape and has tapered internal and external surfaces. In the uninstalled state, the sealing member is positioned circumferentially about the expander core tapered segment. Flanges on the expander core and sealing member insure proper positioning of the plug. Installation of the plug is effected by forcing the plug into an opening of a container until the container walls contact the sealing member. Continued application of force on the expander core forces the core through the sealing member until the position of the sealing member is changed from circumscribing the expander core tapered segment to circumscribing the core cylindrical segment. Alternative embodiments include a hollow expander core to allow the plug to function as an adapter plug and a grooved sealing member.

11 Claims, 4 Drawing Figures

PUSH PLUG

BACKGROUND OF THE INVENTION

The present invention relates to expansion plug devices and more particularly to expansion plugs having deformable sealing members.

Plugs for sealing containers are well known and are available in a plethora of shapes, sizes and functional designs. Examples of such plugs are plumbers plugs for stopping pipe-line leaks, barrel bungs, core-hole closing devices and quick-acting stoppers.

In the interest of economy and efficiency, plugs should be adaptable to a variety of conditions and opening sizes. Thus, most of the known plugs have some degree of size variability. One plug having size variability uses a flexible, resilient seal with some type of expander core fitted therethrough. Examples of this design are found in Hearne U.S. Pat. No. 3,550,636, Meulendyk et al. U.S. Pat. No. 3,525,365 and Rice U.S. Pat. No. 2,321,515.

Ease of installation is also a desirable feature for closure plugs. Obviously, an easy installation technique results in a fast and efficient plug installation. Such efficiency results in savings of both manpower and equipment downtime.

A further requirement, perhaps even more important than efficient installation, is stability and reliability of an installed plug. It is obviously undesirable to have a plug fail or come out of place shortly after installation.

The drawbacks inherent with presently known plugs are magnified when such plugs are to be installed under difficult environmental conditions such as are found in underwater applications. Installation of presently known plugs usually requires tools (e.g. wrenches, screwdrivers and the like). Such tools must be carried by a diver to the container. Any additional equipment which must be carried by a diver is cumbersome and unwieldy. Furthermore, in underseas applications, environmental pressures reach extreme levels thus causing high levels of strain on any plug used. High environmental pressures tend to exaggerate the drawbacks of tapered plug expanders such as the device shown in Meulendyk. High pressures cause migration or movement of any flexible sealing member along the expander core. Such migration may eventually lead to failure of the plug by movement of the sealing member out of the opening. Thus, while some presently available plugs ameliorate some of the above-discussed drawbacks, none of the presently-known plugs ameliorate all of these drawbacks.

The present invention overcomes these drawbacks by providing a flexible, readily insertable and removable plug having a core expander member shaped to prevent sealing member migration once the plug is installed.

SUMMARY OF THE INVENTION

Briefly, the present invention is a flexible closure plug which is easily inserted and removed. The closure plug comprises an elongated expander core having at least two longitudinally adjacent segments, one cylindrical in cross-section and one tapered in cross-section. An annular deformable sealing member is positioned circumferentially on and deformed by the expander core. The inner surface of the sealing member is tapered to approximately correspond to the taper of the expander core tapered segment. In the free state prior to plug installation the sealing member is positioned circumferentially around the expander core tapered segment.

The shape of the expander core provides an important advantage to the present invention. As the installed seal rests on a straight surface, pressure exerted on the sealing member is directed radially thus significantly reducing any migration tendencies of the flexible sealing material.

The plug is installed by inserting the tapered end of the expander core into a container opening and forcing the plug into the hole until the sealing member contacts the walls of the opening. Continued longitudinal force on the expander core forces the core through the sealing member. The installation of the plug is complete when the position of the sealing member has been transferred from circumscribing the expander core tapered segment to circumscribing the core cylindrical segment.

Removal of the plug is simply effected by forcing the expander core outwardly (e.g. in a direction opposite to the force exerted during installation) through the opening.

Therefore, no special tools are required for either installing or removing the plug described herein. The gains in efficiency and economy are further enhanced by the reliability of the installed plug.

Alternative embodiments of the plug include a plug having a hollow core to allow the plug to be used as an adapter device to connect conduits inside a container to conduits outside the container. Grooves or ridges on the sealing member are also provided to produce better gripping action between the sealing member and the container walls.

OBJECTIVES OF THE INVENTION

A broad objective of the present invention is to provide a readily insertable and removable closure plug.

Another objective of the present invention is to provide a closure plug which will remain in place once installed.

A still further objective of the present invention is to provide a method of installing and removing a closure plug which method does not require special tools.

Yet another objective of the present invention is to provide a closure plug which can be used as an adapter plug.

BRIEF DESCRIPTION OF THE DRAWINGS

A more complete appreciation of the invention and many of the attendant advantages thereof will be readily appreciated as the same becomes better understood by references to the following detailed description when considered in connection with the accompanying drawings wherein.

DESCRIPTION OF THE PREFERRED EMBODIMENTS

Figure 1:
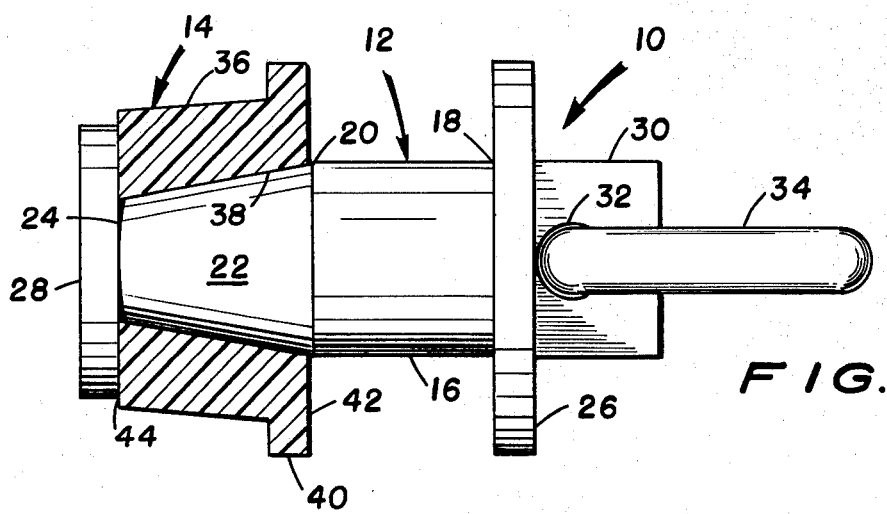
FIG. 1 shows the closure plug of the present invention in the free, uninstalled state.

Shown in FIG. 1 is a readily insertable and removable closure plug 10 comprising an expander core 12 having positioned thereon a deformable seal member 14.

The expander core 12 comprises at least two longitudinally adjacent segments, such as cylindrical segment 16 extending from core end 18 to shoulder 20 and tapered segment 22. The cross-sectional diameter of tapered segment 22 varies uniformly from essentially equal to the cross-sectional diameter of cylindrical segment 16 at shoulder 20 to a smaller cross-sectional diameter at core end 24.

Core 12 also comprises a pressure flange 26 perpendicularly attached to core 12 at end 18 and retaining flange 28 perpendicularly attached to core 12 at core end 24. The flanges 26 and 28 insure proper positioning of sealing member 14 in both the uninstalled and installed states of plug 10.

A removal tab 30 having a hole 32 and removal ring 34 is attached to pressure flange 26 to allow easy removal of plug 10 from a container opening.

Positioned on core 12 is annular deformable sealing member 14 having tapered surfaces 36 and 38 and sealing flange 40. The taper of surface 38 approximately corresponds to the taper of expander core section 22 and the seal axial length between seal ends 42 and 44 is slightly less than the axial length of tapered section 22. The taper of surface 36 eases installation of plug 10 into a variety of container opening sizes and shapes.

Figure 2:
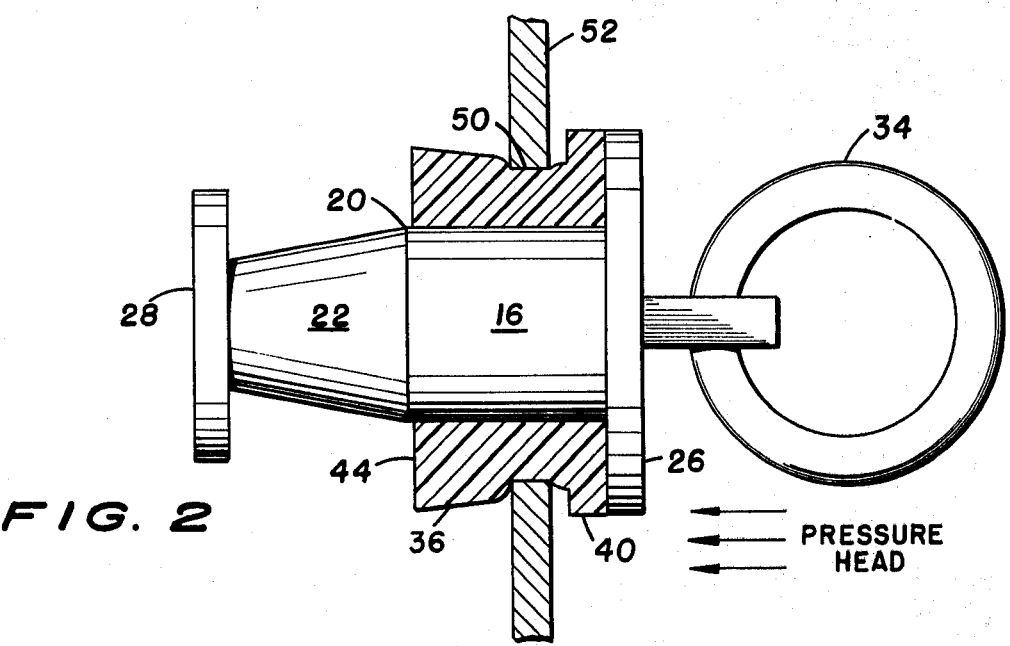
FIG. 2 shows the closure plug of the present invention installed in a container opening.

Seal member 14 is positioned on tapered segment 22 when the plug 10 is in the free (uninstalled) stated shown in FIG. 1. However, as shown in FIG. 2, when the plug 10 is installed in an opening 50 of container wall 52, the seal member is forced onto core cylindrical segment 16. The installed position of plug 10 as shown in FIG. 2 is obtained by inserting the plug 10, retaining flange 28 first, through opening 50 until tapered segment 36 of seal 14 contacts the walls 52. Continued force on pressure flange 26 or removal tab 30 forces core 12 through the seal annular opening defined by seal internal tapered surface 38 thus deforming the seal. Continued pressure on core 12 eventually forces the core into the position shown in FIG. 2 wherein the seal member 12 is positioned circumscribing cylindrical segment 16 with seal pressure flange 26 adjacent sealing flange 40 and seal end 44 adjacent shoulder 20. Generally installation is accomplished from the high pressure side of container walls 52 as indicated in FIG. 2.

As shown in FIG. 2, surface 36 of seal member 14 is deformed by wall 52. The cylindrical shape of core segment 16 provides an important advantage to plug 10. Because the sealing member rests on an untapered surface, the pressure exerted on the seal through walls 52 is directed radially in a uniform manner. Thus, there is no tendency for the seal material to migrate out of opening 50. Thus, once installed, the plug 10 is stable. A tapered shape for segment 16 would cause migration of seal 14 and thus, eventually result in the unplugging of opening 50.

Removal of plug 10 is easily accomplished by forcing core 12 through sealing member 14 until core tapered segment 22 is again positioned adjacent seal tapered surface 38, then removing plug 10 from opening 50 using tab 30 or ring 34. Movement of core 12 can be accomplished by applying longitudinally directed force to core 12 at retaining flange 28.

An alternative method of removing plug 10 includes moving core 12 using removal tab 30 and ring 34. It is evident that ease of removal is important in an underwater environment, as any tools or equipment is cumbersome to transport and use in such conditions. Furthermore, by interconnecting rings 34 of several plugs, the plugs can be easily and quickly removed in sequence or simultaneously by a single diver.

Figure 3:
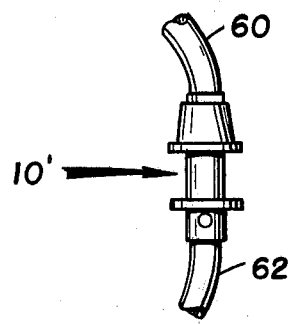
FIG. 3 shows an alternative embodiment of the closure plug providing an adapter connection between conduits.

An alternative embodiment of the plug is shown as adapter plug 10' in FIG. 3. Plug 10' is hollow and can be used as an adapter device whereby conduits such as 60 and 62 may be attached to adapter plug 10'.

Figure 4:
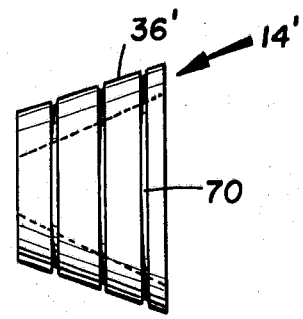
FIG. 4 shows an alternative embodiment of the sealing member of the present invention having a plurality of grooves on the outer surface thereof.

Shown in FIG. 4 is a plug sealing member 14 having grooves 70 in exterior surface 36 to form a sure-lock for walls 52.

Plug 10 or adapter plug 10' may also be used to adapt electrical connections to a bread-board.

Obviously numerous modifications and variations of the present invention are possible in light of the above teachings. It is therefore to be understood that, within the scope of the appended claims, the invention may be practiced otherwise than as specifically described.

What is claimed as new and desired to be secured by Letters Patent of the United States is:

1. A readily insertable and removable closure plug comprising:
    an elongated expander core comprising at least two longitudinally adjacent segments, a first segment cylindrical in cross-sectional shape, and a second segment tapering in cross-sectional shape, said second segment having a cross-sectional diameter varying from at one end essentially equal to the cross-sectional diameter of said first cylindrical segment to a smaller cross-sectional diameter at the other end; and
    an annular deformable sealing member positioned circumferentially on and deformable by longitudinal movement of said expander core, said sealing member having tapered inner and outer surfaces.

2. The closure plug of claim 1 including a retainer flange positioned on said expander core tapered segment and further including a pressure flange positioned on said expander core cylindrical segment.

3. The closure plug of claim 2 including a removal tab section positioned adjacent said pressure flange.

4. The closure plug of claim 3 including a removal ring connected to said removal tab.

5. The closure plug of claim 1 wherein said deformable plug includes a sealing flange.

6. The closure plug of claim 1 wherein said deformable plug is an elastomer.

7. The closure plug of claim 1 including grooves on the outer surface of said sealing member.

8. The closure plug of claim 1 wherein said elongated expander core includes an axial passage extending through said cylindrical segment and said tapering segment.

9. The closure plug of claim 8 further comprising:
    a sealing member retainer flange positioned on said expander core tapered segment; and
    a pressure flange positioned on said expander core cylindrical segment.

10. The closure plug of claim 9 wherein said deformable plug includes a sealing flange.

11. The closure plug of claim 10 further comprising a removal tab section positioned adjacent said pressure flange.

* * * * *